(12) United States Patent
Simmons et al.

(10) Patent No.: US 7,021,020 B2
(45) Date of Patent: Apr. 4, 2006

(54) MOMENT-RESISTANT BUILDING FRAME STRUCTURE COMPONENTRY AND METHOD

(75) Inventors: Robert J. Simmons, Hayward, CA (US); Walid M. Hicham Naja, San Carlos, CA (US)

(73) Assignee: SMRSF Inc., Hayward, CA (US)

( * ) Notice: Subject to any disclaimer, the term of this patent is extended or adjusted under 35 U.S.C. 154(b) by 0 days.

(21) Appl. No.: 10/884,314

(22) Filed: Jul. 2, 2004

(65) Prior Publication Data

US 2005/0072108 A1    Apr. 7, 2005

Related U.S. Application Data

(63) Continuation of application No. 09/943,711, filed on Aug. 30, 2001, now Pat. No. 6,837,016.

(51) Int. Cl.
*E04C 2/38* (2006.01)
(52) U.S. Cl. .................. 52/656.9; 52/653.2; 52/655.1; 52/696
(58) Field of Classification Search ............... 52/648.1, 52/655.1, 653.1, 696.1, 721, 656.9, 696; 403/173, 211
See application file for complete search history.

(56) References Cited

U.S. PATENT DOCUMENTS 3,289,999 A * 12/1966 Konzak .......................... 251/6
5,289,665 A * 3/1994 Higgins ..................... 52/655.1
6,802,169 B1 * 10/2004 Simmons ................... 52/648.1

* cited by examiner

*Primary Examiner*—Carl D. Friedman
*Assistant Examiner*—Yvonne M. Horton
(74) *Attorney, Agent, or Firm*—Patterson & Sheridan, LLP.

(57) ABSTRACT

Column-beam building frame structure, wherein columns and beams are interconnected to distribute and share all lateral loads through collars that encircle columns at the nodal points of attachments between columns and beams. Each collar includes inner and outer components which seat, and gravity-lock together, during frame construction, and which also to offer a certain amount of immediate moment resistance to lateral loads. Tension bolt and nut assemblies lock the inner and outer collar components together, and with these assemblies in place, the collars (which circumsurround the beams) function to deliver beam moment loads as plural-position, angularly distributed compression loads to different side regions of columns.

8 Claims, 5 Drawing Sheets

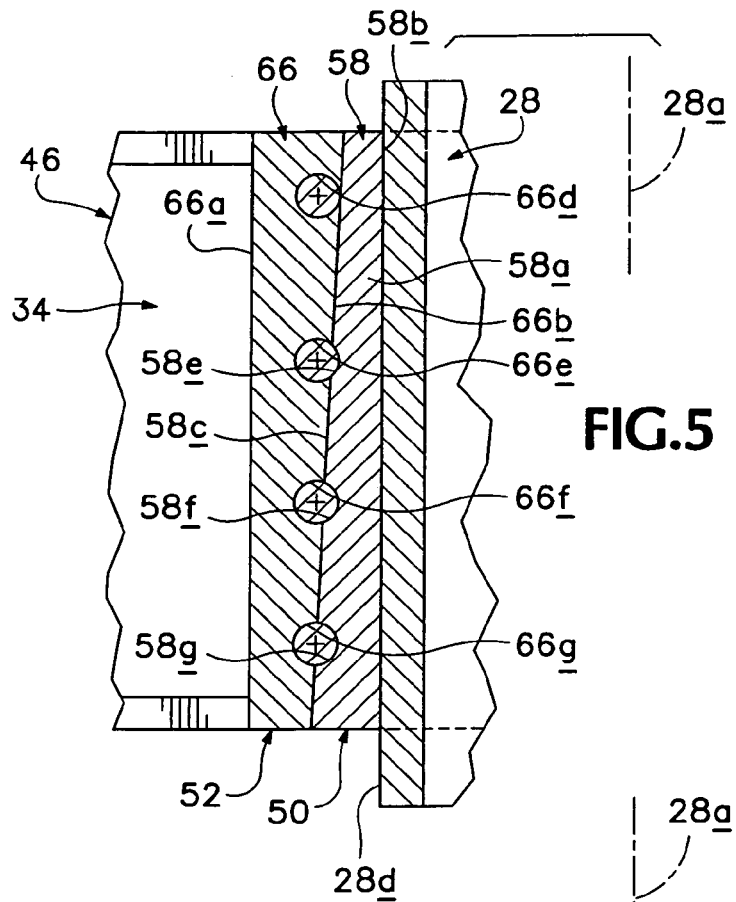
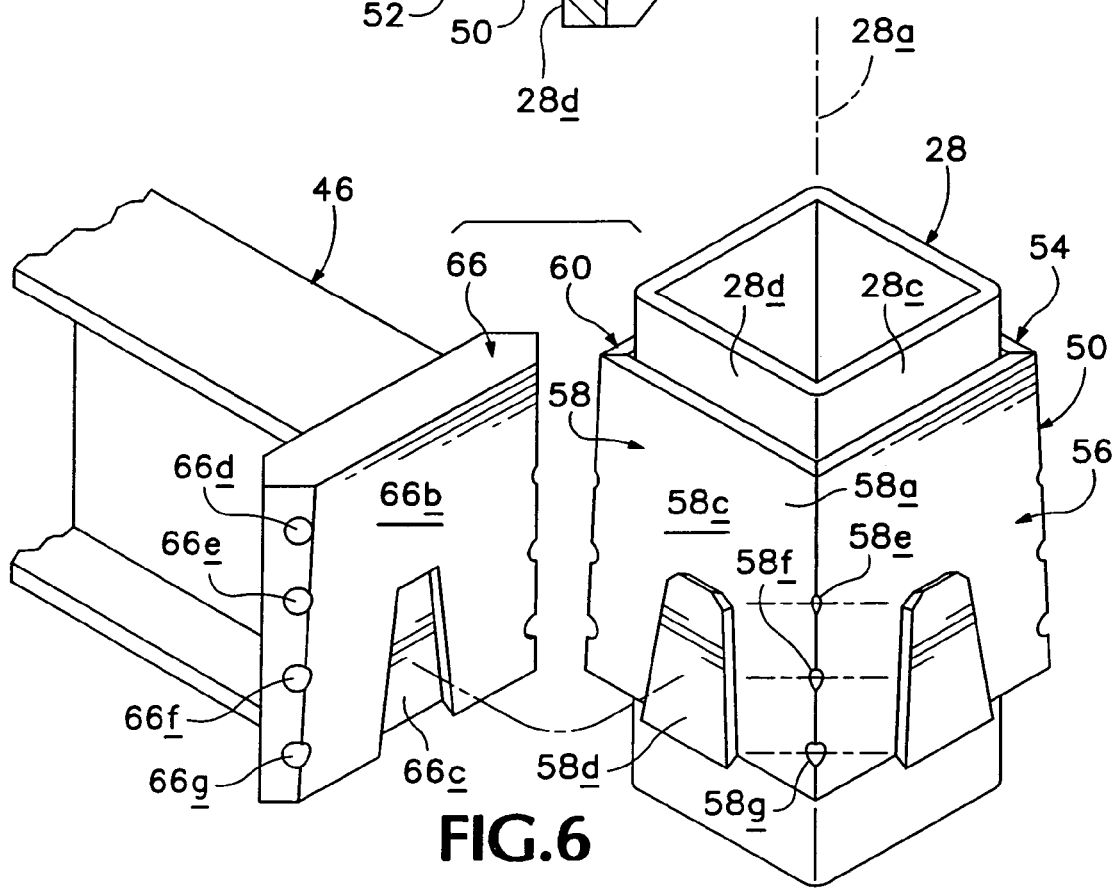

MOMENT-RESISTANT BUILDING FRAME STRUCTURE COMPONENTRY AND METHOD

CROSS-REFERENCE TO RELATED APPLICATIONS

This application is a continuation of U.S. application No. 09/943,711 filed on Aug. 30, 2001 now U.S. Pat. No. 6,837,016 by Simmons et al., incorporated by reference.

BACKGROUND AND SUMMARY OF THE INVENTION

This invention (structure and method) relates to building structure, and in particular to a novel column/beam/collar-interconnect structural organization (and related methodology) which functions to create an improved and very capable moment-resistant frame for a building. Featured in the practice of the invention is a unique, bearing-face collar-interconnect structure which joins adjacent columns and beams at nodes of intersection between them.

In the ongoing effort to improve building frame structure, and particularly to improve such structure so that it can better handle severe lateral loads, such as earthquake loads, much attention has been focused on the manner in which upright columns and horizontal beams are connected. The present invention especially addresses this issue, and in so doing, offers a number of unique and important advantages in building-frame construction, and in ultimate building-frame performance.

According to a preferred embodiment of, and manner of practicing, the present invention, the invention proposes a column-beam interconnect structural system and methodology wherein the ends of beams are joined to columns at nodes of intersection through unique collar structures that effectively circumsurround the sides and the long axes of columns to deliver, through confronting bearing faces, compressive loads which are derived from moment loads experience by the beams. In particular, the delivery through compression of moment loads carried from beams to columns involve the development in the columns of vertically offset reverse-direction compression loads which create related moments in the columns. With respect to each and every lateral load that is experienced by a building frame constructed in accordance with the invention, all lateral loads are essentially equally shared by all of the columns, and a consequence of this is that, in comparison to building frame structures built conventionally, a building frame structure constructed in accordance with this invention prevents any single column from carrying any more load than is carried by any other column. As will become apparent, this important feature of the invention, as it performs, enables a building to be constructed in such a way as to exceed minimum building code requirements in many instances, and thus open the opportunity for using a building frame in accordance with this invention in settings where conventional frame structure would not meet code requirements.

The nodal connections which result from practice of the present invention function to create what is referred to as three-dimensional, multi-axial, moment-coupling, load transfer interconnection and interaction between beams and columns.

Focusing on the specific load-delivery interaction which occurs between a given single column and a connected single beam that bears a moment load, this load is coupled compressively into the column by the associated, single, nodal collar structure at plural bearing-face regions which are angularly spaced about the column's long axis. Compressive load-transfer coupling is not constrained to just one plane of action, or to just one localized region of load delivery. Compression couplets are created to take fuller advantage of columns' load-handling capabilities.

The proposed nodal collar structures include inner components which are anchored, as by welding, to the outside surfaces of columns, and an outer collar which is made up of components that are suitably anchored, also as by welding, to the opposite ends of beams. The inner and outer collar components are preferably and desirably formed by precision casting and/or machining, and are also preferably pre-joined to columns and beams in an automated, factory-type setting, rather than out on the construction job site. Accordingly, the invented collar components lend themselves to economical, high-precision manufacture and assembly with columns and beams, which can then be delivered to a job site ready for accurate assembly.

As will become apparent from an understanding of the respective geometries proposed by the present invention for the collar components, these components play a significant role during early building-frame assembly, as well as later in the ultimate performance of a building.

At the regions of connection between beams and columns, and with respect to pairs of adjacent columns standing upright approximately correctly (vertically) in space on a job site, as beams are lowered into horizontal positions, the outer collar components that they carry at their opposite ends seat under the influence of gravity through special, angular, bearing-face geometry provided in them and in the confronting inner column components. This bearing-face geometry effectively guides and collects a lowered beam, and the associated two columns, into stabilized, gravity-locked conditions, with these now-associated beam and column elements then essentially correctly aligned and positioned in space relative to one another. Male/female cleat/socket configurations formed in and adjacent the confronting bearing-face portions of the inner and outer collar components function under the influence of gravity, during such preliminary building construction, not only to enable such gravity locking and positioning of the associated frame components, but also to establish immediate, substantial stability and moment resistance to lateral loads, even without further assembly taking place at the nodal locations of column-beam intersections.

Following preliminary frame assembly, appropriate tension bolts are preferably introduced into the collar structures, and specifically into the components of the outer collar structures, effectively to lock the inner and outer collar structures in place against separation, and to introduce available tension load-bearing constituents into the outer collar structures. Such tension load bearing plays an important role in the way that the structure of the present invention gathers and couples beam moment loads multidirectionally into columns.

Confronting faces between the inner and outer collar components function as bearing faces to deliver, or transfer, moment loads (carried in beams) directly as compression loads into the columns. In particular, these bearing faces deliver such compression loads to the columns at plural locations which are angularly displaced about the long axes of the columns (because of the axial encircling natures of the collars). Such load distribution takes substantially full advantage of the load-carrying capabilities of the columns with respect to reacting to beam moment loads.

Accordingly, a building frame structure assembled in accordance with this invention results in a remarkably stable and capable frame, wherein all lateral loads transfer via compression multiaxially, and at distributed nodes, into the columns, and are born in a substantially relatively evenly and uniformly distributed fashion throughout the entire frame structure. Such a frame structure requires no bracing or shear walls, and readily accommodates the later incorporation (into an emerging building) of both outer surface skin structure, and internal floor structure.

The nodal interconnections which exist between beams and columns according to this invention at least from one set of points of view, can be visualized as discontinuous floating connections—discontinuous in the sense that there is no uninterrupted (homogenous) metal or other material path which flows structurally from beams to columns and floating in the sense that beams and columns could, if so desired, be nondestructively disconnected for any particular purpose. Thinking about the latter consideration from yet another point of view, the connective interface that exists between a beam and a column according to this invention includes a portion which experiences no deformation during load handling, such portion being resident at the discontinuity which exists between beams and columns at the nodal interfaces.

These, and various other, features and advantages which are offered by this invention will become more fully apparent as the description that now follows is read in conjunction with the accompanying drawings.

BRIEF DESCRIPTION OF THE DRAWINGS

FIGS. 3, 4 and 5 are fragmentary, cross-sectional views taken generally along the lines 3—3, 4—4 and 5—5, respectively, in FIG. 2.

FIG. 6 is a fragmentary, angularly exploded, isometric view illustrating the structures of, and the operational relationship between, a pair of inner and outer collar components constructed and functioning in accordance with the present invention.

DETAILED DESCRIPTION

Figure 1:
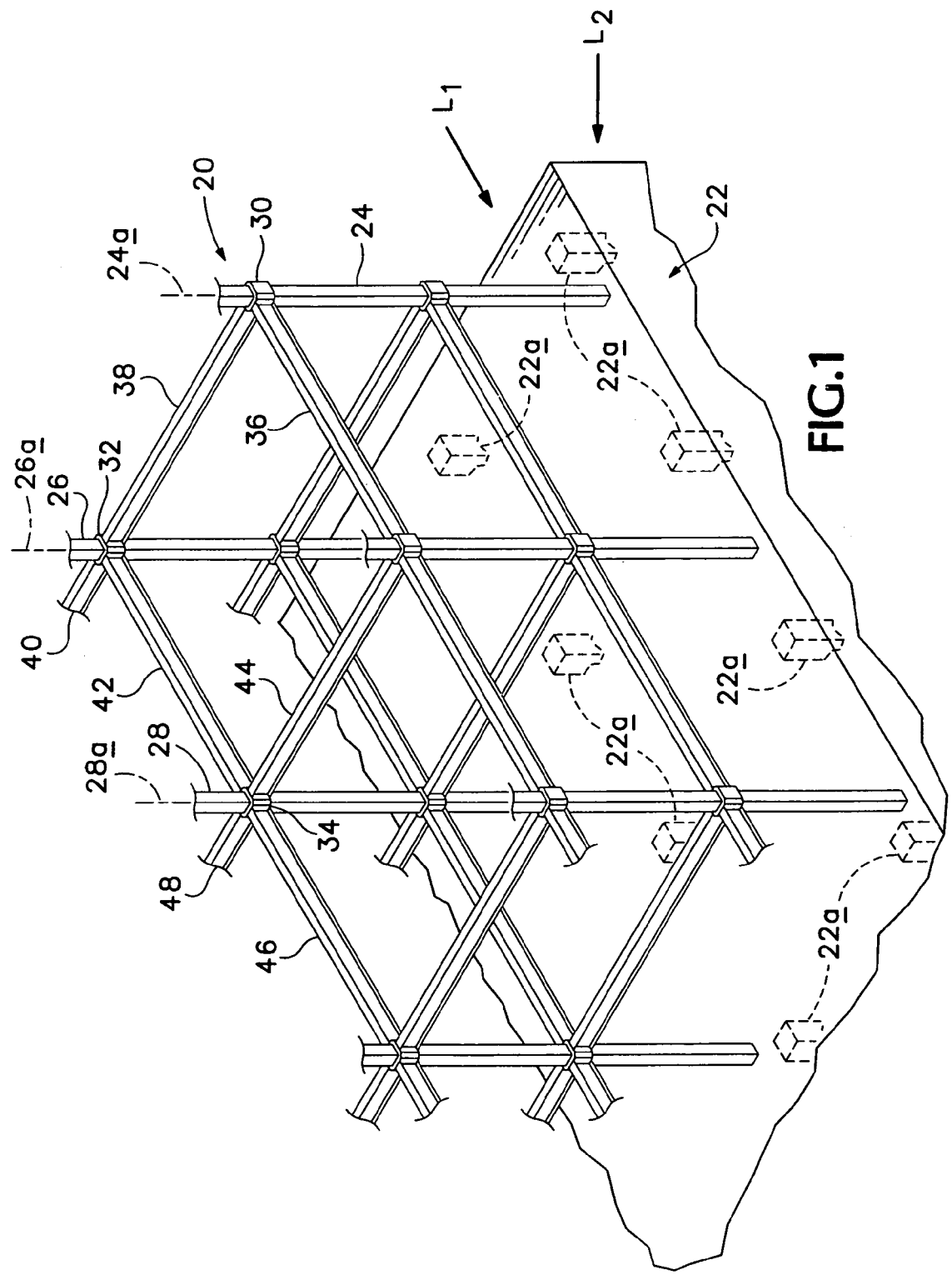
FIG. 1 is a fragmentary, isometric view illustrating a building frame structure which has been constructed in accordance with the present invention, shown in a stage of assembly supported on top of an underlying, pre-constructed, lower building structure, referred to herein as a podium structure.

Turning attention now to the drawings, and referring first of all to FIG. 1, pictured generally at 20 is a building frame structure which has been constructed in accordance with the present invention. This structure is also referred to herein as building structure, and as a structural system. As will be appreciated by those skilled in the art, frame structure 20 might be constructed on, and rise from, any suitable, underlying support structure, such as the ground, but in the particular setting illustrated in FIG. 1, structure 20 is shown supported on, and rising from, the top of a pre-constructed, underlying "podium" building structure 22, such as a parking garage. One reason for illustrating structure 20 herein in the context of being on top of podium structure 22 is to point out an important feature offered by the present invention, and which will be discussed more fully shortly. One should note at this point, in relation to what is shown in FIG. 1, that podium structure 22 includes, among other structural elements, a distributed row-and-column array of columns, such as those shown at 22a. In the context of describing shortly the just-suggested feature and advantage of the structure of the present invention, reference will be made to the fact that the horizontally distributed row-and-column positions of columns 22a is different from that of the columns, now to be more fully discussed, which are present in frame structure 20.

Accordingly, included in frame structure 20, and arranged therein in what has been referred to as a row-and-column array, are plural, upright, elongate columns, such as those shown at 24, 26, 28. The long axes of columns 24, 26, 28, are shown at 24a 26a, 28a respectively. At one elevation in frame structure 20, connected to columns 24, 26, 28, through collar structures, or collars (also referred to as collar-form interconnect structures), 30, 32, 34, respectively, are elongate horizontal beams 36, 38, 40, 42, 44, 46, 48. Collars 30, 32, 34, as is true for (and with respect to) all of the other collars employed in frame structure 20, are substantially alike in construction. Collar 30 accommodates the attachment to column 24 of beams 36, 38. Collar 32 accommodates the attachment to column 26 of beams 38, 40, 42. Collar 34 accommodates the attachment to column 28 of beams 42, 44, 46, 48.

It should thus be understood that the particular embodiment of the invention now being described offers a system for connecting, at a single node of connection with a column, up to a total of four beams. As the description of this invention progresses herein, those skilled in the art will recognize that modifications of the invention can be introduced and employed easily enough to accommodate an even greater number of connections, at a particular "node of connection".

The specific embodiment and methodology of the invention presented herein, is(are) shown and described with respect to a building frame structure wherein the columns are hollow in nature, are formed of steel, and possess a generally square cross-section, with four orthogonally associated, outwardly facing sides, or faces. Also, the invention is described herein in connection with employing conventional I-beam-configuration beams.

These choices for column and beam cross-sectional configurations should be considered to be illustrative and not limiting with respect to the scope of utility, to advantages offered by, and to characteristics of, the present invention. Put another way the structure and methodology of the present invention accommodate wide ranges of beam and column configurations and materials.

Continuing now with FIG. 1, one should note therein that the row-and-column array of columns in frame structure 20 is such that the long axes of the associated columns are not aligned on a one-to-one basis with the long axes of previously mentioned columns 22a in podium structure 22. It should further be noted that the bases of the columns in structure 20 may be anchored in place near the top of the podium structure in any suitable manner, the details of which are neither specifically illustrated nor discussed herein, inasmuch as these anchor connections form no part of the present invention.

Directing attention now to FIGS. 1–6, inclusive, the interconnection, or interface, region between a column and a beam according to the present invention is specifically discussed with respect to the region where column 28 connects with the adjacent ends of beams 42, 44, 46, 48. This region of connection, a nodal region (or node), is one which employs previously mentioned collar 34. The description which now follows for collar 34 per se should be understood to be essentially a detailed description of all of the other collars employed in frame structure 20. With respect to this description, four orthogonally associated, outwardly facing, planar faces 28b 28c 28d 28e in column 28 are involved.

Figure 2:
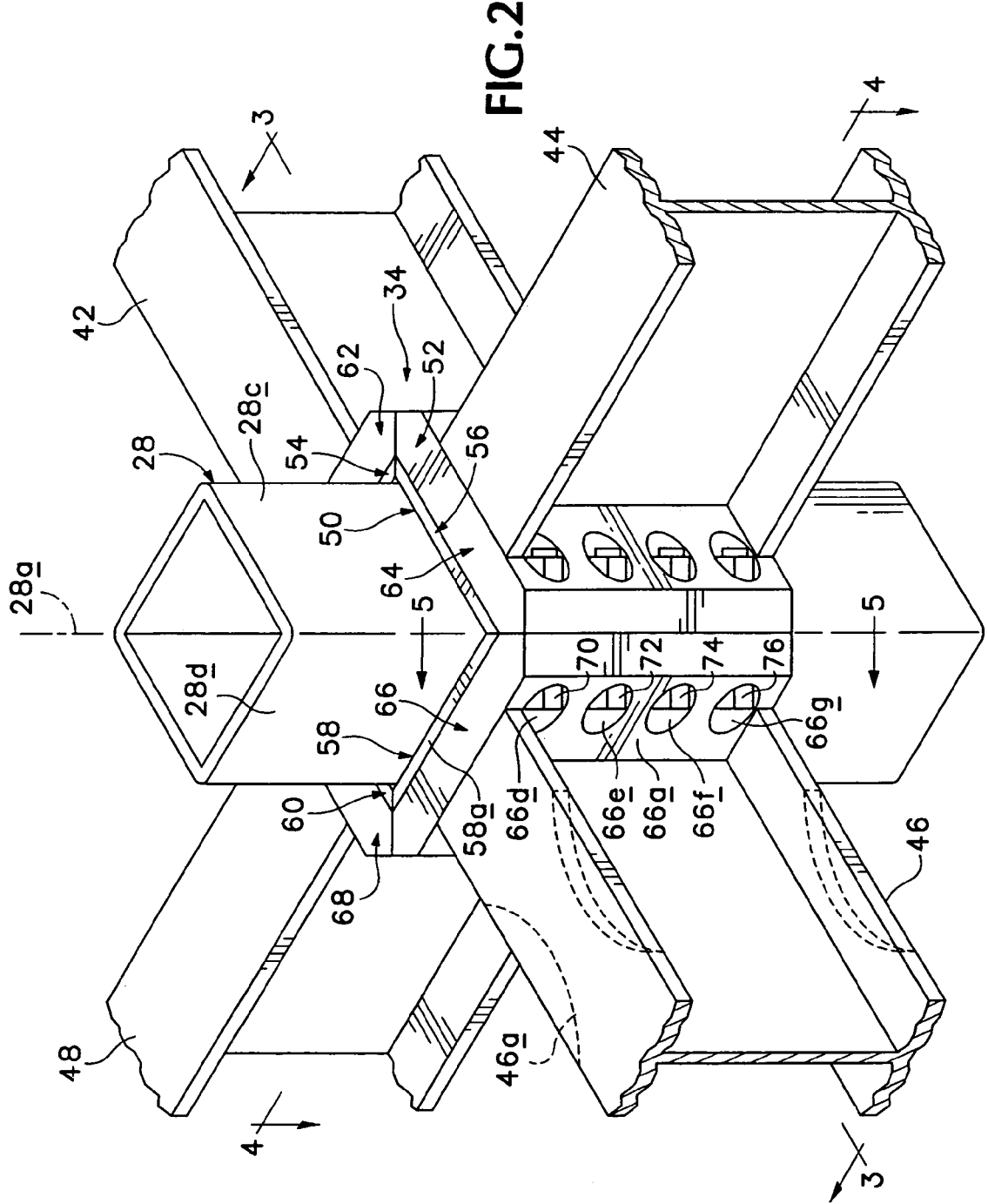
FIG. 2 is a fragmentary, isolated, isometric view illustrating collar structure employed at one nodal location in the building frame structure of FIG. 1 in accordance with the present invention.

As a note here regarding FIG. 2, shown in dashed lines at 46a is a representation of an optional conventional beam "fuse" which may be used in the beams in structure 20, if so desired. The functionality of such a fuse, as a plastic yield protector is well understood. Representative fuse 46a appears only in FIG. 2.

Collar 34 includes an inner collar structure (or column-attachable member) 50, and an outer collar structure 52. These inner and outer collar structures are also referred to herein as gravity-utilizing, bearing-face structures, or sub-structures. The inner collar structure is made up of four components shown at 54, 56, 58, 60. The outer collar structure is made up of four components (or beam-end attachable members) 62, 64, 66, 68. Each of these components in the inner and outer collar structures is preferably made off the job site by precision casting and/or machining, with each such component preferably being pre-assembled appropriately with a column or a beam, also at a off-site location. Inner collar components 54, 56, 58, 60 are suitably welded to faces 28b 28c 28d 28e, respectively, in column 28. Outer collar components 62, 64, 66, 68 are suitably welded to those ends of beams 42, 44, 46, 48, respectively, which are near column 28 as such is pictured in FIGS. 2–6, inclusive. Such precision manufacture, and pre-assembly with columns and beams, results in what will be recognized to be a very high-precision interconnect system between beams and columns in frame 20.

Each of the four components just mentioned above (54, 56, 58, 60) which make up inner collar structure 50 is essentially identical to the other such components, and accordingly, only component 58 is now described in detail. Component 58 includes a somewhat planar, plate-like body 56a, with an inner, planar face 58b which lies flush with column face 28d. Body 58a also includes a planar, outer face 58c which lies in a plane that slopes downwardly and slightly outwardly away from the long axis 28a of column 28 (see particularly FIGS. 3 and 5). Face 58c is referred to herein as a bearing face.

Figure 3:
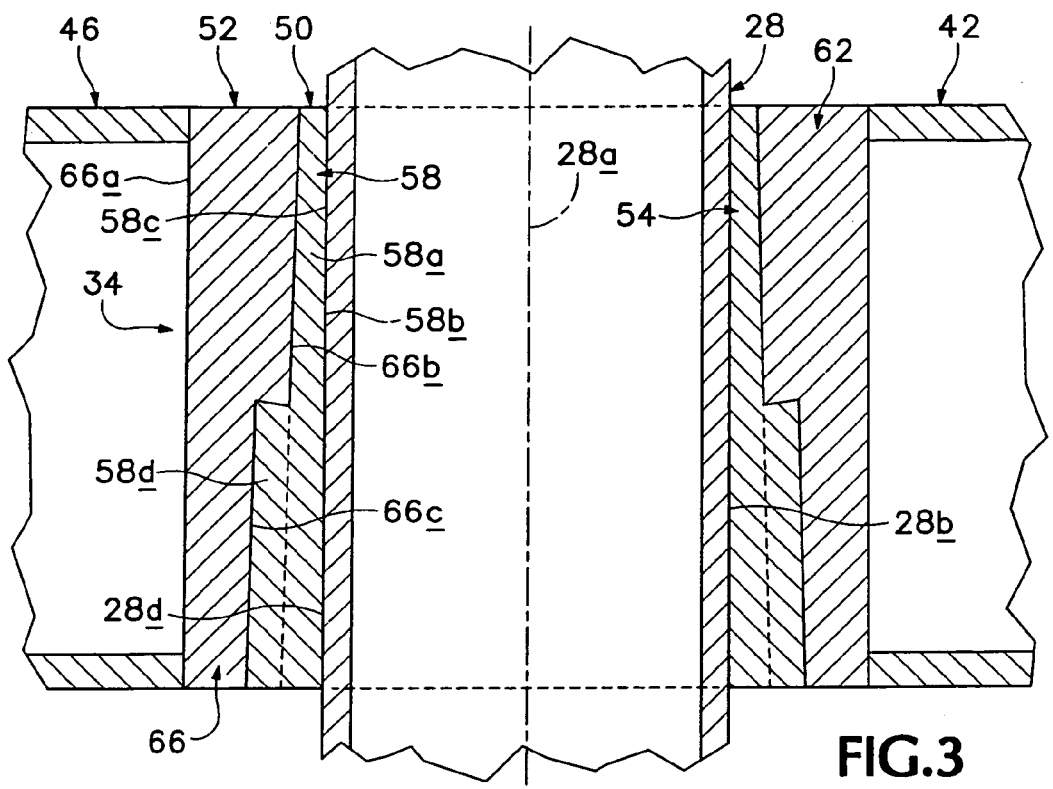
Figure 4:
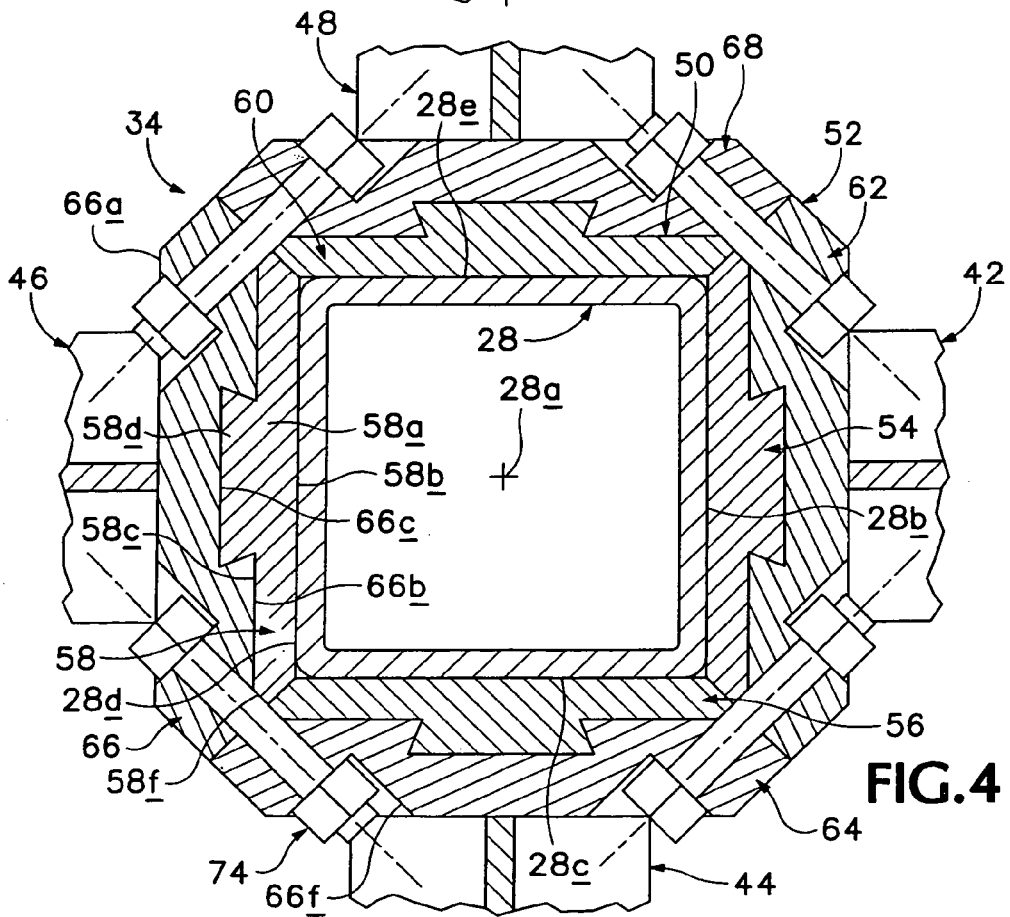

Projecting as an island outwardly from face 58c as illustrated is an upwardly tapered, wedge-shaped cleat 58d which extends, with generally uniform thickness, from slightly above the vertical midline of component 58 substantially to the bottom thereof. The laterally and upwardly facing edges of cleat 58d are underbeveled for a reason which will become apparent shortly. This underbeveling is best seen in FIGS. 3, 4 and 6. Cleat 58d is referred to herein also as cleat structure, and as gravity-effective, first-gender structure.

In building structure 20, inner collar component 58 connects, in a complementary manner which will now be described, with outer collar component 66 in outer collar structure 52. Structure 52 constitutes a column-axis-circumsurrounding portion of collar structure 50. The somewhat planar body of component 66 has an outer face 66a which is welded to beam 46, and which is vertical in disposition in structure 20. Component 66 also has a broad, inner face 66b which lies in a plane that substantially parallels the plane of previously mentioned component face 58c in inner collar component 58. Face 66b is also referred to herein as a bearing face.

Appropriately formed within the body of component 66, and extending into this body from face 66b is an angular, wedge-shaped socket 66c which is sized to receive, snuggly and complementarily, previously mentioned cleat 58d. Cleat 58d and socket 66c are referred to herein collectively as gravity-mating cleat and socket structure. The three lateral walls of socket 66c are appropriately angled to engage (fittingly) three of the underbeveled edges in cleat 58d. Socket 66c is also referred to herein as gravity-effective, second-gender structure.

Looking now at both of components 58, 66, and completing descriptions of their respective constructions, formed at the two lateral sides of component 66 are four, countersunk, bolt-receiving bore holes, such as those shown at 66d 66e 66f 66g. Formed in the lateral edges of component body 58a are three related notches, such as those shown at 58e 58f, 58g. Notches 58e 58f 58g align with bore holes 66e 66f 66g, respectively, when components 58, 66 are properly seated relative to one another as pictured in FIGS. 1-5, inclusive. Appropriate dash-dot lines and cross marks in FIGS. 4, 5 and 6 illustrate the central axes of these (and other non-membered) boreholes, and how these axes (certain ones of them) align with the mentioned and illustrated notches, The notches herein are also referred to as bolt clearance passages.

Returning now to a "larger" point of view regarding the nodal connection established at collar 34, one can see that the four beams which here connect with column 28 do so through the components of the collar's inner and outer collar structures, both of which make up the entirety of collar 34. In particular, one should note that collar 34 essentially circumsurrounds or encircles the outside of column 28, as such is viewed along its long axis 28a. Outer collar structure 52 seats floatingly and discontinuously (as previously discussed) on inner collar structure 50.

Completing a description of what is shown in FIGS. 1-6, inclusive, sets of appropriate tension bolts and nuts are employed to lock together the components that make up the outer collar structures. With reference to the connections established through collar 34, four sets of four nut and bolt assemblies join the sides of outer collar structure components 62, 64, 66, 68, extending at angles as shown across the corners of the resulting outer collar structure. Four such assemblies are shown generally at 70, 72, 74, 76 in FIG. 2. Assembly 74, as seen in FIG. 4, includes a bolt 74a with an elongate shank 74b that extends, inter alia, in the bolt-clearance passage created by notch 58f and by the counterpart notch present in adjacent component 56.

These nut and bolt assemblies effectively lock the outer collar structure around the inner collar structure, and impede vertical movement of the outer collar structure relative to the inner collar structure, The bolt and nut assemblies also perform as tension-transmitting elements between adjacent outer collar components with respect to moment loads that are carried in the beams which connect through collar structure 34 to column 28. The bolt and nut assemblies assure a performance whereby each moment load in each beam is delivered by collar 34 in a circumsurrounding fashion to column 28.

Figure 7:
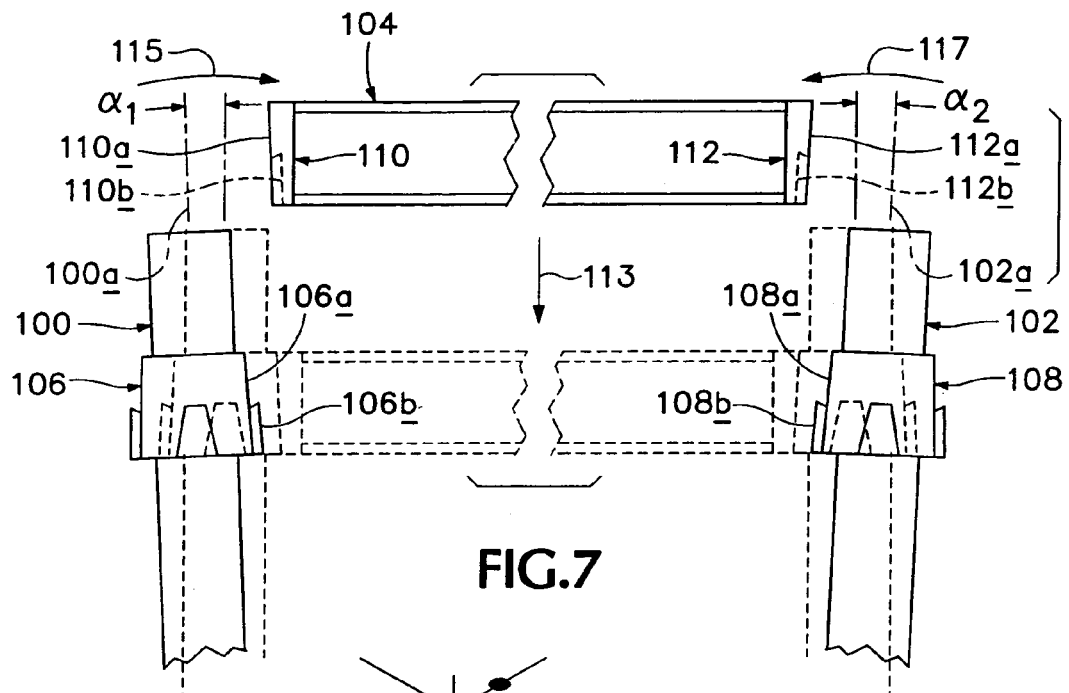
FIGS. 7 and 8 are two different views stylized to illustrate a feature of the present invention involving how gravity lowering of a horizontal beam into place between pairs of adjacent columns functions to create, immediately, a moment-resistant, properly spatially organized, overall building frame structure.
Figure 8:
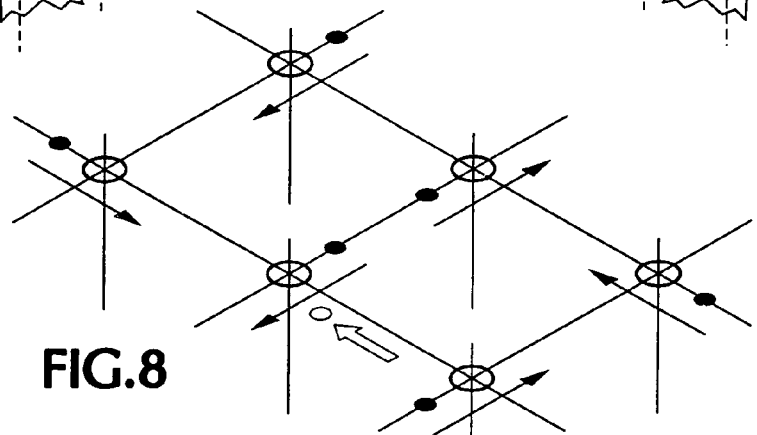
Figures 9, 10:
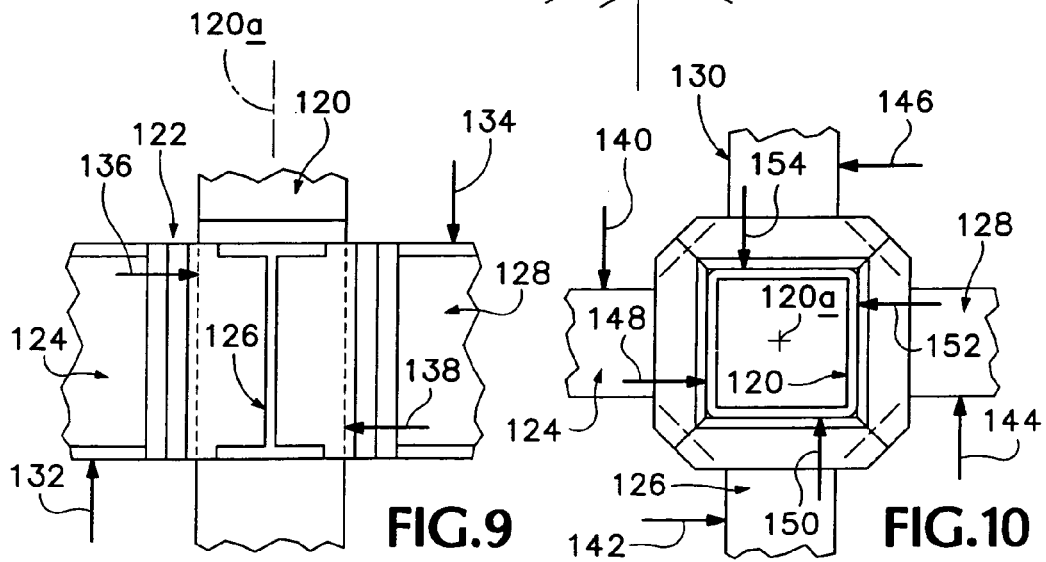
FIGS. 9 and 10 are employed herein to illustrate generally how collar components built in accordance with the present invention function to handle and distribute beam moment loads into columns.

Switching attention now to FIGS. 7–10, inclusive, these four drawing figures (herein new and different reference numerals are employed) help to illustrate certain assembly and operational features and advantages that are offered by the present invention. FIGS. 7 and 8 illustrate stabilizing, positioning, and aligning activities that take place during early building-frame assembly during lowering of beams into place for connection through the collars to the columns. FIGS. 9 and 10 illustrate generally how the apparatus of the present invention functions uniquely to handle moment loads that become developed in the beams, and specifically how these loads are handled by delivery through bearing face compression to and around the long axis of a column. As will become apparent, some of the moment-handling performance which is pictured in FIGS. 9 and 10 also takes place during the events pictured in FIGS. 7 and 8.

Beginning the discussion of what is shown in FIG. 7, here there are illustrated, fragmentarily and in solid lines (moved positions), two upright columns 100, 102, and a not-yet-in-place, generally horizontal beam 104. Column 100 is appropriately equipped, at a desired elevation, with an inner collar structure 106, and column 102 with a similar inner collar structure 108. For the purpose of explanation herein regarding what is shown in FIG. 7, two particular portions only inner collar structures 106, 108 are relevant. These include, in collar 106, an inclined bearing face 106a and an associated cleat 106b and in collar 108, an inclined bearing face 108a and a projecting cleat 108b.

Welded, as previously described, to the opposite ends of beam 104 are two outer collar structure components 110, 112. As was true with regard to the just-mentioned inner collar structure components which are welded to columns 100, 102, with regard to components 110, 112, there are only two relevant structural features that should be identified and addressed specifically. These include an inclined bearing face 110a and a socket 110b in component 110, and an inclined bearing face 112a and a socket 112b in component 112.

In solid lines, columns 100, 102 are shown inclined away from one another as pictured in the plane of FIG. 7, and specifically with their respective long axes, 100a, 102a, occupying outwardly displaced angles $c\sim$ and $u_2$, respectively, relative to the vertical. Reference to these angular displacements being outward is made in relation to the vertical centerline of FIG. 7. It should also be noted that the angular vertical misalignment pictured in columns 100, 102 has been exaggerated for the purpose of exposition and illustration herein.

Generally speaking, while there may often (or always) be some lack of true verticality in columns that have not yet been connected in accordance with the invention, the out-of-verticality condition (as a practical reality) will typically be modest enough so, that upon lowering of a beam into position for attachment, such as lowering of beam 110 for attachment (through collar components 106, 108, 110, 112) to columns 100, 102, the confronting bearing faces and cleat and socket structure present in the opposite ends of the beam will be close enough to one another to cause the components to engage without special effort required to cause this to happen.

Upon lowering of beam 104 as indicated by arrow 113, and assuming that the angular misalignment condition which is exaggerated in FIG. 7 is not quite so great, components 106, 110 begin to contact one another, as do also components 108, 112. Very specifically, with progressive lowering of the beam, the respective confronting (and now engaging) cleats and sockets begin to nest complementarily. The underbeveled edges of the lateral sides of the cleats, in cooperation with the matching complementary lateral surfaces in the gathering sockets, to draw the two columns toward one another. In particular, the two columns are shifted angularly toward one another (see arrows 115, 117) into conditions of correct relative spacing, alignment and relative angular positioning, with beam 110 ending up in a true horizontal disposition. Such a true horizontal condition for beam 104 depends, of course, upon the columns having the correct relative vertical dispositions. Lowering of the beam, and urging of the columns into the positions just mentioned, effectively comes to a conclusion with gravity causing the beam to "lock" into a condition between the columns, with the cleats and receiving sockets fully and intimately engaged, and with the major bearing surfaces, 106a, 110a and 108a, 112a, confronting and in contact with one another.

It should thus be apparent that the act of lowering the beam into place, causes gravity effectively to create a stabilized and positionally locked relationship between a pair of columns and a beam. In addition to this action, creates a situation wherein the bearing surfaces that confront one another near the opposite ends of the beam, and between the relevant inner and outer collar structure components, immediately self-position themselves (as influenced by gravity) to deal with certain moment loads that may be experienced by the beams immediately thereafter and during ongoing fabrication of the overall building frame structure.

It should be apparent that, while FIG. 7 has been employed to illustrate a specific condition in a single plane where two columns are effectively splayed outwardly away from one another, the columns might be in a host of different relative angular dispositions in relation to the vertical. For example, they could both effectively be leaning in the same direction as pictured in FIG. 7, or they could be leaning toward one another. Further, they could be leaning in either or all of those different kinds of conditions, and also leaning into and/or out of the plane of FIG. 7.

FIG. 8 pictures schematically this more general, probable scene of column non-verticality. It does so in a somewhat three-dimensional manner. Here, single elongate lines are pictured to illustrate obvious representations of an array of columns (vertical lines) and a layer of beams (angled lines) interconnected to the columns through collars which are represented by ovate shapes that surround regions of intersection of the beams and columns. Black ovate dots, which are presented on certain regions of the lines representing beams, along with single-line dark arrows, suggest, in the case of the black dots, former non-vertical, angular positions for the upper regions of the adjacent columns, with the arrows indicating directions of adjustments that occur as various ones of the different beams are lowered into positions between the columns. This arrangement of black dots and dark arrows in FIG. 8 clearly illustrates a very typical situation where, until a layer, so-to-speak, of beams is set into place (by gravity) at a particular elevation in a frame structure, the columns may have different conditions and angles of nonverticality.

Still looking at FIG. 8, the black dot and the dark arrow which appear at the extreme left side of this figure, along with an open, small, ovate dot and an open stubby arrow somewhat below and to the right of the left side of FIG. 8, generally picture the situation which was described with reference to FIG. 7 above.

Turning attention now to FIGS. 9 and 10, and beginning with FIG. 9, here there is shown a column 120 having an elongate axis 120~, coupled through a collar 122 to four beams, only three of which are shown in FIG. 9—these being illustrated at 124, 126, 128. Digressing for just a moment to FIG. 10 which shows the same beam and column arrangement, here, the fourth beam 130 can be seen.

In FIG. 9, beams 124, 128 are shown loaded with moments, such being represented by arrows 132, 134, respectively. Focusing on just one of these moments, and specifically, moment 132, this moment is coupled by bearing-face compression through the inner and outer components of collar 122, as indicated by arrow 136. It is thus through compression that the moment load experienced (as illustrated in FIG. 9) by beam 124 is communicated, at least partially, by collar 122 to column 120. Continuing because of the unique construction of collar 122 in accordance with the invention, and because of the presence of tension-transmitting nut and bolt assemblies in collar 122, the outer collar structure within collar 122 also delivers compression through bearing faces that are present on the right side of collar 122 in FIG. 9. Such compression delivery is illustrated by arrow 138 in FIG. 9.

It is thus the case that moment 132 is delivered through bearing-face compression to angularly spaced locations that are distributed around (at different angular locations relative to) the long axis 120a of column 120. As a consequence, major load handling capability of column 120 is called upon and used immediately to deal with moment 132.

Moment 134 which has the direction indicated in FIG. 9 creates a similar kind of reaction in the manner of being delivered by way of compression through bearing faces distributed at angularly-spaced locations around the axis of column 120.

It should thus be seen how, because of the unique structure of the nodal interconnections which exist in the relationship between a beam, a column and a collar structure according to the invention, moment loads are offered substantially the full-load handling resources of columns. And because of the fact that an overall frame structure which is constructed in accordance with the present invention is made up of an interconnected network of collar-form nodes, constructed and operating as described herein, essentially every lateral load delivered into such a building frame structure is distributed completely throughout the structure, and handled quite uniformly throughout, and by all of, the involved and associated columns, FIG. 10 illustrates how lateral loads may come into existence in the beams so as to create, in a particular plane of beams, horizontal moment loads such as those illustrated by arrows 140, 142, 144, 146. If such moment loads come into existence, each one of them is effectively delivered as bearing-face compression through collar structure to plural, angularly distributed sides of columns, such as column 120. Such plural-location compression delivery of moment loads 140, 142, 144, 146 is represented by arrows 148, 150, 152, 154.

Because of the manner just generally described in which the structure of the present invention performs to handle moment loads in beams, a frame constructed according to the invention can be employed as pictured in FIG. 1—, i.e., on top of a podium structure, with respect to which columns in the super structure do not align axially with the columns in the podium structure. An important reason for this advantage is that the structure of the present invention distributes loads in such a fashion that all columns in the row and column array of columns, interconnected through collar form nodes constructed according to the invention, share relatively equally in bearing lateral loads delivered to the superstructure frame. Specifically all of the columns share loads in such a fashion that they can be employed without requiring that they be aligned with underlying structure columns, at least up to certain superstructure building dimensions which are larger than any which would be typically permitted today under currently applicable building codes.

Another important feature of the invention which has already been suggested earlier is that the components of the collar structures lend themselves to precise pre-manufacture in a factory-like setting, and even under automated control, all with the result that a building frame can be constructed with a high degree of on the job simplicity and accuracy. Not only that, but the particular configurations proposed for the inner and outer collar components that interconnect beams and columns cause a frame, during assembly, and just under the influence of gravity, to lock in a stabilized and quite capable moment-load carrying condition, even before tension-carrying bolt assemblies are introduced to lock outer collar structures into rigidity relative to their various internal components, and to impede separation of inner and outer collar components.

A further obvious advantage of the invention is that the components proposed by it are extremely simple in construction can be manufactured economically.

The existence, according to the invention, of nodal interconnections which have the floating and discontinuous natures mentioned earlier herein results in a frame structure wherein, after a severe lateral load event, essentially "resettles" to its pre-load condition.

Accordingly, while a preferred embodiment of the invention, and a manner of practicing it, have been illustrated and described herein, it is understood that variations and modifications may be made without departing from the spirit of the invention.

The invention claimed is:

1. A self-stabilizing, moment-resistant, collar-form, elongate-column/elongate-beam interconnect structure for use in a building comprising
   a collar-form column-attachable (CA) member including plural, laterally outwardly facing, sloping, interconnection bearing faces, and
   a collar-form beam-end-attachable (BA) member including plural, laterally inwardly facing, sloping, interconnection bearing faces which substantially parallel said outwardly facing bearing faces,
   said CA and BA members being constructed for seated interconnection in a manner whereby gravity causes their respective bearing faces to seat self-seekingly and complementarily relative to one another in confronting, bearing-face opposition, thereby to establish nominal, three-dimensional, lateral positional and moment-resistant stability between the two members without the requirement for any other interconnecting structure.

2. The interconnect structure of claim 1, wherein said CA and BA members include complementarily mateable cleat and socket structure.

3. The interconnect structure of claim 1, wherein said BA member includes plural, bolt-interconnected components, and said CA member includes bolt-clearance passages which, with said CA and BA members seated relative to one another, and with bolts, which includes shanks, interconnecting said BA submembers, the shanks in said bolts extend within said clearance passages to impede unseating of the two members.

4. The interconnect structure of claim 1, wherein, with said CA and BA members seated relative to one another, each of said bearing faces lies in a plane which slopes downwardly and away from the column's long axis.

5. Moment-resistant, spatial-position-determining and stabilizing interconnect structure for interconnecting, during the preliminary construction of a building, the end of an elongate, generally horizontal beam to an elongate, generally upright column, said interconnect structure, in operative condition, comprising
- a first, inner, interconnect collar structure anchored to such a column circumsurroundingly relative to the column's long axis, and including first, gravity-utilizing, outwardly facing, sloping, bearing-face substructure including outwardly facing bearing faces, and
- second, outer, interconnect collar structure anchored adjacent the end of such a beam, and including second, gravity-utilizing, inwardly facing, sloping, bearing-face substructure including inwardly facing bearing faces which substantiality parallel said outwardly facing bearing faces,
- said second, bearing-face substructure being seatingly mateable, under the influence of gravity, on and with respect to said first bearing-face substructure during preliminary building construction to establish a gravity-locked and stabilized, moment-resistant interconnection between the associated column and beam, which interconnection tends to create, independently, the correct spatial disposition of the column and beam in the building.

6. Moment-resistant interconnect structure for establishing a three-dimensional, multi-axial, moment-coupling, load-transfer interconnection and interaction between an elongate column and an elongate beam, said interconnect structure comprising
- inner collar structure selectively anchorable to such a column circumsurroundingly relative to the column's long axis, and
- outer collar structure selectively joinable to an end of such a beam, and constructed for discontinuous, circumsurrounding, bearing-face coupling to said inner collar structure for the compression transfer of moment loads between the associated beam and column at locations distributed angularly about the long axis of the column and on the outside of the column.

7. A moment-resistant, bearing-face, load-transfer interconnection between an elongate column and an elongate beam, said interconnection, in operative condition, comprising
- a first bearing-face structure joined to such a column to form an inner collar structure which generally circumsurrounds the column's long axis, said first bearing-face structure including plural bearing faces each facing outwardly relative to, and at different locations spaced angularly about, the column's long axis,
- second bearing-face structure joined to an end in such a beam to form an outer collar structure which also generally circumsurrounds the column's long axis, and which is disposed as a jacket surrounding said inner collar structure, said second bearing-face structure including plural bearing faces each opposingly facing at least one of said bearing faces in said first bearing-face structure, and
- connector structure operatively connecting said first and second bearing-face structures in a manner whereby the opposing bearing faces in said first and second bearing-face structures confrontingly oppose one another to promote compression load transfer therebetween, and thus between the column and the beam, with such load transfer being derived from moment loads carried in said beam.

8. Gravity-lock, self-positioning and stabilizing, moment-frame building structure comprising
- plural elongate columns each equipped, at one or more locations along their respective lengths, with axially circumsurrounding inner collar structure which includes first-gender, gravity-effective cleat structure including laterally outwardly facing sloping face structure including outwardly facing faces, and
- plural elongate beams each attached, adjacent opposite ends, to outer collar structure which includes second-gender, gravity-effective cleat structure that is mateable, under the influence of gravity, complementarily with said first-gender cleat structure, said second-mentioned cleat structure including laterally inwardly facing, sloping face structure which is complementarily contactable with said first-mentioned sloping face structure and which includes inwardly facing faces that substantially parallel said outwardly facing faces,
- gravity-mating of said first- and second-gender cleat and sloping face structures creating therebetween, and thus between the associated column and beam, a gravity-locked, stabilized, correctly relatively positioned, moment-resistant interconnection between that column and beam.

* * * * *